United States Patent [19]

Chang et al.

[11] Patent Number: 4,887,875
[45] Date of Patent: Dec. 19, 1989

[54] FIBER OPTIC CONNECTOR FOR USE IN TEMPORARY REPAIR OF MULTIPLE FIBER CABLE

[75] Inventors: Peter Chang, Lisle; Darrin J. Bergman, Naperville, both of Ill.; Donald W. Duda, Williams Bay, Wis.

[73] Assignee: Amphenol Corporation, Wallingford, Conn.

[21] Appl. No.: 185,346

[22] Filed: Apr. 25, 1988

Related U.S. Application Data

[63] Continuation of Ser. No. 921,933, Oct. 20, 1986, abandoned.

[51] Int. Cl.⁴ ................................................. G02B 6/36
[52] U.S. Cl. ................................. 350/96.21; 350/96.20
[58] Field of Search ............................. 350/96.2, 96.21

[56] References Cited

U.S. PATENT DOCUMENTS

| | | | |
|---|---|---|---|
| 4,204,306 | 5/1980 | Makuch | 350/96.2 |
| 4,470,660 | 9/1984 | Hillegonds et al. | 350/96.21 |
| 4,486,072 | 12/1984 | Roberts | 350/96.21 |
| 4,487,474 | 12/1984 | Nishie et al. | 350/96.21 |
| 4,607,911 | 8/1986 | Rhodes | 350/96.2 |
| 4,614,401 | 9/1986 | Strait, Jr. | 350/96.21 |
| 4,634,214 | 1/1987 | Cannon, Jr. et al. | 350/96.20 |
| 4,650,276 | 3/1987 | Lanzisera et al. | 350/96.2 |
| 4,681,398 | 7/1987 | Bailey et al. | 350/96.21 |
| 4,696,537 | 9/1987 | Bauer et al. | 350/96.2 |
| 4,718,745 | 1/1988 | Strait, Jr. | 350/96.21 |
| 4,728,171 | 3/1988 | Schefield et al. | 350/96.2 |
| 4,746,194 | 5/1988 | Rasmussen | 350/96.2 |

*Primary Examiner*—John S. Heyman
*Assistant Examiner*—Timothy P. Callahan
*Attorney, Agent, or Firm*—Bacon & Thomas

[57] ABSTRACT

A fiber optic connector is provided for use in temporary repair of broken fiber optic cables. The connector comprises a ceramic plug having a front end and a rear end and a passageway extending through the plug with the passageway sized to snugly receive a buffer stripped optical fiber therethrough in a manner such that the fiber extends out the front end of the plug. The passageway has a size proximate the rear end thereof to permit a portion of buffer covered optical fiber to received therein and thus serves, at the narrow portion of the passageway, as a stop limiting the amount of forward movement of the fiber. A plug support serves to support the rear end of the ceramic plug and includes a passageway coextensive with the plug passageway. The wall surfaces of the passageway are such that they cooperate with a chuck which is attached to the plug support which has clamping fingers such that when the clamping fingers engage the wall surface, they serve to close down upon a buffer covered fiber to securely hold the buffer covered fiber within the connector.

8 Claims, 2 Drawing Sheets

FIG. I

FIBER OPTIC CONNECTOR FOR USE IN TEMPORARY REPAIR OF MULTIPLE FIBER CABLE

This application is a continuation of application Ser. No. 921,933, filed 10/20/86.

BACKGROUND OF THE INVENTION

This invention relates to an improved fiber optic connector of simple structure for use in the rapid temporary repair of ruptured or cut cables having optical fibers therein.

In present day fiber optic long line telephone communications fiber optic cables containing anywhere between 12 to 72 fibers are employed which permit a high volume of telephone communications to be conducted. However, due to the nature of the material of the cable, i.e., the fibers, these cables are often subject to damage from a variety of different sources, for example, standard construction digging and/or accidents wherein a vehicle impacts against the cable thus severing the cable and fibers therein. These disruptions are often very expensive costing the various telecommunication companies involved whose cable is severed up to $200,000 per minute for the time that the cable is severed. It thus becomes necessary to quickly and accurately reconnect the various fibers to each other.

Various techniques for repairing or joining cables which have been damaged or broken are known in the prior art. One prior art technique for joining cables provides that the ends of the cables to be joined together are first reduced in diameter by using a swagging technique. A portion of each end is then removed to reveal the conductors to be joined together. After the conductors have been joined together, a longitudinally slotted length of tubing is placed around the exposed joined conductors. The tubing is then filled with a suitable insulation material such as powdered mineral insulation by inserting the insulation material into the tubing through the slot. The length of the tubing is then closed by welding and connected to the cable ends by welding or brazing. The entire joint is then drawn about the conductor joint to provide the joined cables with a substantially uniform outside diameter. Such a technique is illustrated in U.S. Pat. No. 4,375,720 to Bourget.

Another prior art technique is disclosed in U.S. Pat. No. 4,580,874 to Winter et al. which provides a method for repairing or joining together optical fiber cables by using a ferrule to connect two optical fiber lengths. Each cable length comprises a metal tube containing one or more optical fibers and a filler material. The ferrule is placed in overlapping relationship with each tube and a lap joint is effected between the ferrule and each tube. An outer sleeve having a length substantially equal to a gap between the tubes is formed about the ferrule and is bonded to each tube. The outer sleeve preferably has an outer periphery substantially corresponding to the outer periphery of the tube so that the joined cable has a substantially continuous surface.

Other examples of prior art fiber repair kits are disclosed in U.S. Pat. No. 4,367,019 to Gray and U.S. Pat. No. 4,379,614 to Liertz.

Although providing effective means of joining fibers together of ruptured or broken cables, in practice all of these prior art teachings are time consuming and do not solve the problem of the extensive cost involved when such a cable is ruptured or severed. Accordingly, it becomes apparent that what is needed is a quick temporary reconnection device which will repair and maintain the telecommunication lines intact until such time as an adequate substitute fiber optic cable can be placed under service in place of the temporarily repaired cable.

Accordingly, in accordance with the invention conventional permanent connector technology such as that, for example, illustrated in U.S. Pat. No. 4,487,474 and in the Assignees copending application Ser. No. 892,976 which was filed Aug. 4, 1986, and whose disclosure is specifically incorporated by reference herein, are combined with temporary fiber aligning and positioning technology such as that disclosed in U.S. Pat. No. 4,537,466 to provide a new and improved temporary connector which provides precise alignment of fibers relative to each other and permits quick and temporary repair of ruptured or broken fiber optic cables.

SUMMARY OF THE INVENTION

In accordance with the invention there is provided a fiber optic connector comprising a ceramic plug having a front end and a rear end. A passageway extends through the plug with he passageway sized to snugly receive a buffer stripped optical fiber therethrough in a manner extending out the front end of the plug. The passageway has a size proximate the rear end such as to permit a portion of buffer covered optical fiber to be received therein. A plug support supports the rear end of the ceramic plug. The plug support has a passageway which is coextensive with the plug passageway, and includes biasing wall surfaces in the support passageway at a location proximate to the rear end of the ceramic plug. Chuck means having clamping means for holding a fiber is provided, with the chuck means having a passageway extending therethrough coextensively with the plug support passageway whereby an optical fiber can be passed therethrough and into the ceramic plug to extend from front end of the ceramic plug. The chuck means is engagable to the plug support in a manner such that the biasing wall surface is engaged the clamping means to cause the clamping means to securely seize a buffer covered fiber received therein. When a fiber is assembled within said connector in the manner described, it will extend from the rear of the chuck means through the connector and beyond the front face of the ceramic plug. It then becomes necessary to cleave it flush with the front face of the ceramic ferrule. To this end, a technique similar to that disclosed in assignee's copending application Ser. No. 474,099 which was filed Mar. 10, 1983, and which has now been allowed, and whose disclosure is specifically incorporated by reference herein can be used to effect a flush cleaving of the fiber at the front end of the ceramic ferrule.

In a still more specific aspect, the connector comprises a coupling nut received over the plug support for coupling to an adapter constructed for interconnecting two fiber optic connectors together. Such an adapter is of conventional construction and well known to those of ordinary skill in the art and need not be discussed in further detail herein. In essence, in accordance with the invention there is provided what is typically referred to in the art as an SMA style connector. In this case, the connector is a temporary connector which is intermatable with other standard SMA type connectors, of which the connector disclosed in copending U.S. application Ser. No. 892,976 is illustrative.

In still another aspect, the biasing wall surface of the plug support comprises a sloped wall sloped in the same manner as the slope of split fingers making up the clamping means of the chuck means. The chuck means is engageable to the plug support by means of threads on the outer surface of the chuck means which are engageable with like threads on the inner walls of the plug support passageway. As previously noted, the connector comprises a stop in the passageway in the plug passage for preventing buffer covered fiber from being passed out the front end of the plug whereby only buffer stripped fiber can be passed within the precisely machined passage. In a still further aspect, it is noted that the walls of the passage of the chuck means are coated with a lubricating coating, for example, the coating can be a PTFE polymer such as is conventionally available under the trade name Teflon TM.

BRIEF DESCRIPTION OF THE DRAWINGS

Having thus briefly described the invention, the same will become better understood from the following detailed discussion made with reference to the attached drawings wherein.

DETAILED DISCUSSION OF THE INVENTION

Figure 1:
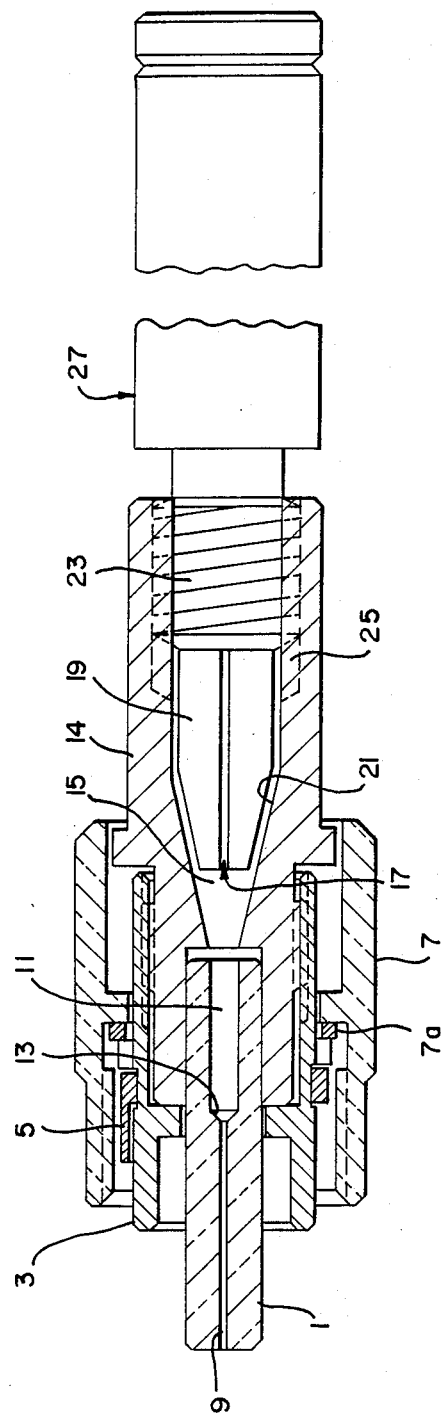
FIG. 1 is a side side-sectional view of the connector in accordance with the invention shown partially assembled but with no fiber shown therein for ease of understanding.
Figure 2:
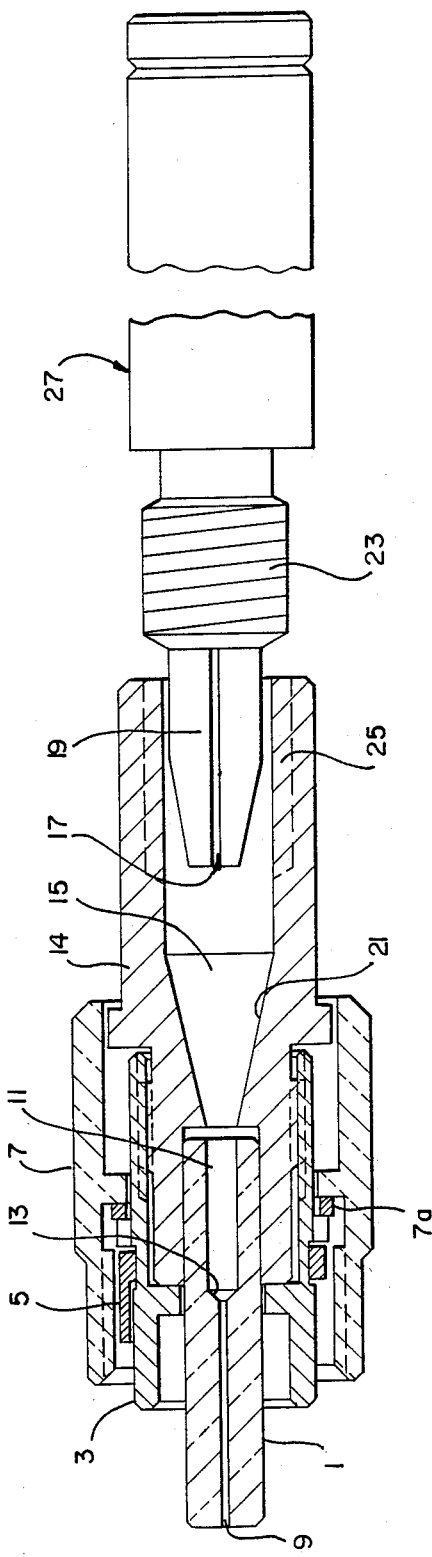
FIG. 2 is a disassembled view of the connector in accordance with the invention showing the chuck means disassembled from the plug support and plug assembly of the connector in accordance with the invention.

A connector in accordance where the invention is shown in FIGS. 1 and 2. It comprises a ceramic ferrule 1 having a passageway 9,11 extending therethrough with a narrower portion 9 sized to snugly receive a buffer stripped fiber therein and a wider portion 11 which serves as a guide channel through ramp surfaces 13 to guide the fiber through and into the passage 9 to extend out the front thereof. As shown therein, the passageway 9 is sized to receive a buffer stripped fiber such that a predetermined amount of buffer material can be stripped from a fiber when being inserted in the connector. Accordingly, the ramp surface 13 serves as a stop and a guide for precise positioning of the fiber. The ceramic ferrule 1 is supported in press-fit engagement within a front body 14. Front body 14 includes a passageway 15 extending therethrough which is coextensive with passageway 9, 11 in the ceramic ferrule 1. Supported on the front body 14 is a key member 3 which includes a key mechanism 5 for the purpose insuring the same reltative rotational position of the connector member when connected to an adapter in the event that a connection and reconnection needs to be effected thus, preventing scaring of the face of the fiber extending flush at the front end of the ferrule 1. A coupling nut 7 of conventional construction is mounted on the front body 14 as shown therein. This coupling nut 7 combines with a conventional washer 7a to provide the means for attaching the connector to an adapter for connection to a compatible connector.

As already discussed, the front body 14 includes the passageway 15 therein which is coextensive with passageway 9, 11, and which includes a sloped ramp surface 21 which serves as a biasing means as will be explained hereinafter. Furthermore, a threaded inner wall portion 25 serves to engage a fiber chuck 27 which will be discussed also hereinafter.

Fiber chuck 27 includes a passageway 17 extending therethrough which opens at the front and rear ends of the chuck 27. At the front end it includes clamp fingers 19 which serve seize a fiber when the chuck member 27 is threaded at threads 23 fully into the front body 14. This is better shown in FIG. 2 which shows the front body 14 and the chuck 27 separated from each other. To facilitate insertion of a fiber and clamping within the connector, the walls of passageway 17 which extends through the rear body portion and out the rear end of the chuck member 27 are preferably coated with a lubricating material, more preferably a PTFE polymer such as is conventionally available under the trade name Teflon TM.

In use in temporarily repairing fiber optic cables, the chuck 27 is partially threaded at threads 23 to the front body 14 a fiber having predetermined length of fibers stripped of buffer material at the front end thereof. The fiber is then inserted from the rear of the chuck member 27 through the chuck member 27 through passageway 17 thereof into passageway 11 and through passageway 9 so that the fiber stripped of buffer material extends out the front of the ferrule 1. The portion of the fiber not stripped of buffer abuts at sloped wall portion 13 as a stop. Thereafter, threading of the chuck member 27 is continued until walls 21 engage the spring fingers 19 at the front end thereof and are thereby forced to close onto the buffer covered fiber to securely hold the fiber at that point. Tightening is conducted to finger pressure. Thereafter, with the fiber extending out the front face of the ferrule 1, the fiber is cleaved flush with the end of the ferrule and the assembly is ready for connection to a matable connector through an adapter of conventional construction. As noted previously, the flush cleaving method can be conducted, for example, as in the method disclosed in U.S. application Ser. No. 474,099 which was filed Mar. 10, 1983 and which is now U.S. Pat. No. 4,643,520.

With respect to the materials employed in the invention, it is noted that the ferrule 1 is preferably of ceramic material. The rest of the parts can be made of conventional metal, for example, stainless steel, and as noted, the passageway 17 of the chuck 27 is preferably coated with a lubricant material such as, for example, PTFE polymer. As to the press-fit positioning of the ferrule 1 so that it extends a precisely known amount from the front body 14, the method of assembling the ferrule to the front body 14 can be conducted, for example, as disclosed in U.S. application Ser. No. 892,976 which was filed Aug. 4, 1986 and whose disclosure is specifically incorporated by reference herein.

Having above indicated a preferred embodiment of the present invention, it will be readily apparent to those skilled in the art that modifications and alternatives can be practiced within the spirit of the invention. It is accordingly, intended to define the scope of the invention only as indicated in the following claims.

What is claimed is:

1. A fiber optic connector comprising:
   a ceramic plug having a front end and a rear end, a plug passageway extending through said plug with said plug passageway sized to snugly receive a buffer stripped optical fiber therethrough in a manner extending out the front end, said plug passageway having a size proximate the rear end such as to permit a portion of buffer covered optical fiber to the received therein;

a plug support supporting the rear end of the ceramic plug, said plug support having a plug support passageway coextensive with said plug passageway, a biasing wall surface in said plug support passageway at a location proximate to the rear end of said ceramic plug and a threaded inner wall portion along said plug support passageway;

chuck means having clamping means for holding a buffer covered fiber, said chuck means having a passageway extending therethrough coextensively with the plug support passageway whereby an optical fiber can be passed from the rear thereof therethrough into said ceramic plug, said chuck means having threads thereon such that it is engageable to the threads on said inner wall portion of said plug support in a manner such that said biasing wall surface engages said clamping means to cause said clamping means to securely seize a buffer covered fiber received therein.

2. A connector as in claim 1 further comprising a coupling nut received over said plug support for coupling to an adapter constructed for interconnecting two fiber optic connectors together.

3. A connector as in claim 1 wherein said clamping means comprises a plurality of tapered spring fingers and said biasing wall surface comprises a sloped wall, sloped to conform to the taper of said spring fingers making up said clamping means.

4. A connector as in claim 1 further comprising a stop in the passageway in said plug passage for preventing buffer covered fiber from being passed out the front end of said plug whereby only buffer stripped fiber can be passed.

5. A connector as in claim 2 further comprising key means for ensuring repeatable relative rotational positioning of the connector upon multiple connections and disconnections.

6. A connector as in claim 1 wherein the chuck means contains a lubricating coating.

7. A connector as in claim 6 wherein said coating in polytetrafluoroethylene polymer.

8. A connector as in claim 5 wherein said key means comprises a sleeve surrounding said ceramic plug and a key mechanism protruding along one portion of said sleeve.

* * * * *